(No Model.)
F. F. KNOUS.
MAGAZINE FIRE ARM.
No. 316,899. Patented Apr. 28, 1885.
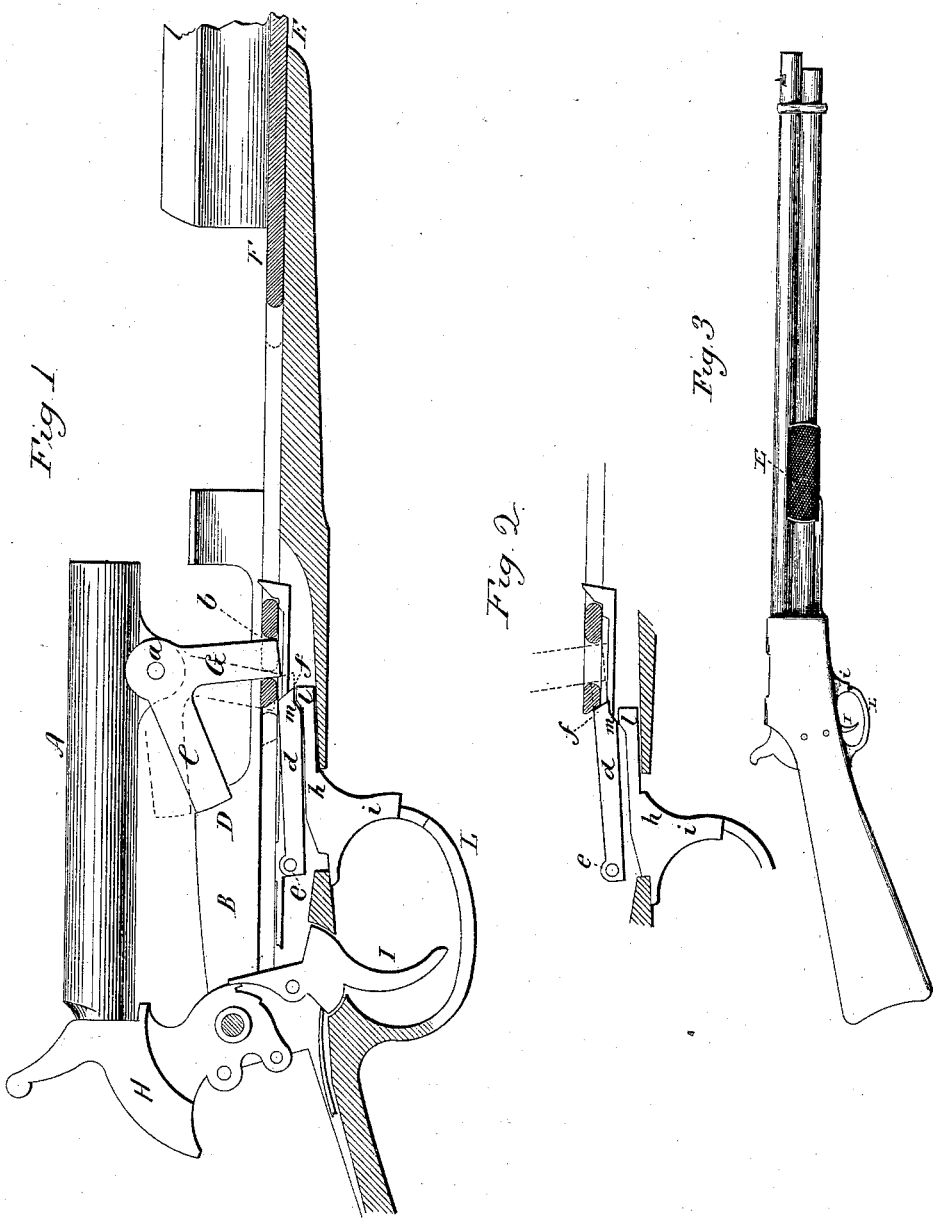

UNITED STATES PATENT OFFICE.

FRANKLIN F. KNOUS, OF HARTFORD, CONNECTICUT, ASSIGNOR TO COLTS PATENT FIRE ARMS MANUFACTURING COMPANY, OF SAME PLACE.

MAGAZINE FIRE-ARM.

SPECIFICATION forming part of Letters Patent No. 316,899, dated April 28, 1885.

Application filed March 9, 1885. (No model.)

*To all whom it may concern:*

Be it known that I, FRANKLIN F. KNOUS, of Hartford, in the county of Hartford and State of Connecticut, have invented a new Improvement in Magazine Fire-Arms; and I do hereby declare the following, when taken in connection with accompanying drawings and the letters of reference marked thereon, to be a full, clear, and exact description of the same, and which said drawings constitute part of this specification, and represent, in—

Figure 1, a sectional side view of the operative mechanism of the breech-piece, showing the locking-dog in its unlocked position; Fig. 2, a side view showing the dog in its locked position; Fig. 3, a side view of the arm complete on a reduced scale.

This invention relates to an improvement in that class of magazine fire-arms in which the breech-piece is arranged to move longitudinally back and forth in line with the barrel, and is caused so to move by a handle underneath the barrel, from which a connection extends rearward to engage the operative mechanism of the arm, and so that as the handle is moved in one direction the breech-piece will be first released from its locked position and then thrown to the rear, or in the reverse movement the breech-piece will be closed and locked, with special reference to the arm for which Letters Patent of the United States No. 285,020 were granted to W. H. Elliot, September 18, 1883. As in this arm the breech-piece is opened by a movement of the handle rearward and closed by its forward movement, the tendency of a jar, such as dropping the arm upon its butt, is to throw the handle rearward, and thereby disengage the breech-locking mechanism. Such accidental movement of the handle and breech-piece allows the cartridge in the chamber, as well as that one which has come from the magazine onto the carrier, to drop out of the gun and be lost, and prevents the gun thereby from being in condition for instant use.

The object of my invention is to prevent such possible accidental movement of the handle or disengagement of the breech-locking mechanism; and it consists in a locking-dog hung in the receiver adapted to engage the operative mechanism of the arm when in its closed position, combined with an arm extending outside the receiver, and by which said dog may be thrown into or removed from its locking position, as more fully hereinafter described.

A represents the breech-piece; B, the receiver; C, the brace hinged to the breech-piece, as at *a*, and so as to drop forward of a shoulder, D, when the breech-piece is in its closed position, and so as to lock the breech-piece in such closed position, and as shown.

E is the handle, which is adapted to slide beneath the barrel; F, a connection extending from said handle rearward; G, an arm on the brace extending downward and into an opening, *b*, in the connection F, and so that by the rear movement of the handle the brace may be thrown up from its locked position, as indicated in broken lines, Fig. 1, and then by the continued rear movement of the handle the breech-piece will be thrown to the rear. The return or forward movement of the handle draws the breech-piece forward to its closed position, and then turns the brace down into its locked position, and substantially as in the patent of Elliot, before referred to.

H is the hammer, I the trigger, and L the trigger-guard, of common construction and arrangement.

In the receiver, below the path of the connection F, a dog, *d*, is hung upon a pivot, *e*, and so that when the dog is down, as in Fig. 1, it is out of the path of movement of the connection F, or the mechanism of the arm, and so as to allow free movement of the same; but when the arm is in its extreme forward position, as seen in Fig. 1, its rear end is substantially forward of the forward end or nose, *f*, of the dog. The nose of the dog is inclined downward and forward, and the rear end of the connection upward and rearward, as seen in Figs. 1 and 2.

Beneath the dog a slide, *h*, is arranged to be moved longitudinally, as from the position seen in Fig. 1 to that in Fig. 2, and return. From this slide an arm, *i*, extends down into the trigger-guard at its forward end, and is greater in width than the thickness of the trigger-guard. When the slide is in the rear position, as seen in Fig. 2, the rear edge of the arm *i* stands within the trigger-guard, and so that the finger in the trigger-guard may be pressed forward against the arm *i* and readily throw it forward into the position seen in Fig. 1; or, if in the position seen in Fig. 1, the finger may be applied to the forward edge of the arm outside the trigger-guard, and thereby draw the slide rearward to the position seen in Fig. 2.

On the upper side or back of the slide $h$ is an inclined shoulder, $l$, and on the under side of the dog $d$ is a corresponding inclined shoulder, $m$. When standing in the position seen in Fig. 1, the shoulder $l$ of the slide is forward of the shoulder $m$ of the dog, and so that in the rear movement of the slide, as from the position in Fig. 1 to that in Fig. 2, the shoulder $l$ will ride under the shoulder $d$ of the dog and force the dog upward in rear of the end of the connection F, and so as to form a stop or lock against the rear movement of the connection, as seen in Fig. 2; or when the slide H is moved forward to permit the dog to drop from such locking engagement, then the slide is free to move to operate the breech-piece and other mechanism of the arm. When, therefore, the arm is in use, and against the shoulder of the person, he may with the trigger-finger first unlock the mechanism of the arm, open the breech-piece, recharge the arm, and return the breech-piece and lock it, and then by the same trigger-finger lock the mechanism itself in the discharging condition.

Unless the handle be thrown to its extreme forward position and the operative mechanism of the arm locked, the dog $d$ cannot be thrown into its locking position, so that the person using the arm may ascertain at once whether or not the breech-piece and mechanism of the arm is in the proper condition for firing by simply moving the slide to throw up the dog. If the slide cannot be thus moved, there is some defect in the mechanism of the arm, and it is not in a condition for firing; but if the dog can be thrown into such position, then he knows the arm is in the condition for firing.

I represents the dog $d$ as thrown into or out of engagement with the connection F from the handle; but the engagement may be made with the lower end of the arm G of the brace, as indicated in broken lines, Fig. 2. I therefore do not wish to be understood as limiting the arrangement of the dog to engagement with the slide, it only being essential that it shall be with some portion of the longitudinal moving mechanism of the arm in substantially connection with the handle, and so that the handle may be locked in its closed position.

I claim—

1. In a magazine fire-arm in which the mechanism of the arm is operated by a handle arranged to move longitudinally beneath the barrel, the combination therewith of a locking-dog, $d$, hung in the receiver, a slide adapted to work beneath the dog and constructed with an arm extending outside the receiver, the said dog and slide constructed with corresponding inclined or cam-like shoulders, substantially as described, and whereby under the movement of said slide in one direction said dog is thrown into a position to lock said handle in its closed position, or moved in the opposite direction will unlock said handle.

2. In a magazine fire-arm in which the mechanism of the arm is operated by a handle arranged to move longitudinally beneath the barrel, the combination therewith of a locking-dog, $d$, hung in the receiver, a slide adapted to work beneath the dog and constructed with an arm extending down into the trigger-guard, the said slide and dog constructed with corresponding inclined or cam shoulders, substantially as described, and whereby under the movement of said slide in one direction said dog is thrown into a position to lock said handle in its closed position, or moved in the opposite direction will unlock said handle.

3. In a fire-arm, the combination of the longitudinally-reciprocating breech-piece, a locking-brace hinged to said breech-piece and extending rearward, a locking-shoulder on the receiver, against which said brace will abut in the closed position of the breech-piece, a locking-dog in the receiver adapted to engage the operative mechanism of the arm when in its closed position, and an arm extending outside the receiver, said arm substantially in connection with said dog, and whereby said dog may be thrown into its locked or unlocked position, substantially as and for the purpose described.

FRANKLIN F. KNOUS.

Witnesses:
C. J. EHBETS,
E. F. BODWELL.